AUDIO AMPLIFIER CIRCUIT

Filed June 27, 1966

INVENTOR.
Robert A. Wolff
BY Nicholas A. Camasto
ATTY.

1

3,433,894
AUDIO AMPLIFIER CIRCUIT
Robert A. Wolff, Lombard, Ill., assignor to Admiral Corporation, Chicago, Ill., a corporation of Delaware
Filed June 27, 1966, Ser. No. 560,417
U.S. Cl. 178—5.8 3 Claims
Int. Cl. H04n 5/60

ABSTRACT OF THE DISCLOSURE

A quadrature type detector drives the grid circuit of an audio output tube having an unbypassed cathode resistor. To offset degeneration introduced by the cathode resistor, an alternating current positive feedback path couples the output tube cathode to the screen grid of the quadrature detector.

Figure 1:
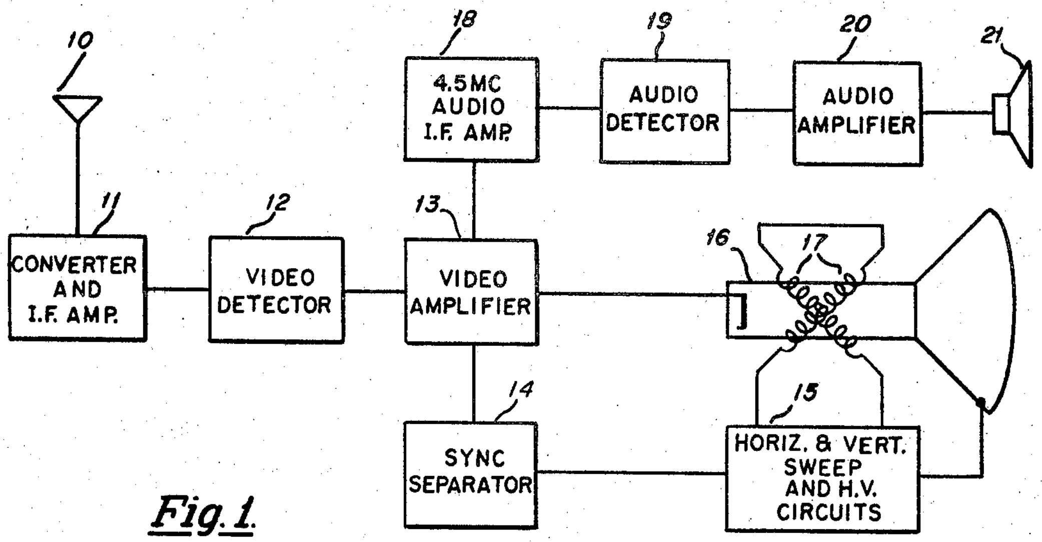

This invention relates in general to signal translating systems and in particular to television receivers and the audio systems therein.

Great simplifications have been made in the audio circuits of television receivers so that today it is not uncommon to employ only an intermediate frequency (IF) audio amplifier, a detector, and an audio output tube whereas, in the past, numerous stages of amplification were required in this section of the receiver. With these simplifications the concomitant problem of efficient utilization of the signal output of the detector to drive the audio output stage has arisen.

This problem could be solved by the use of a fixed bias on the tube in the output stage since this well-known arrangement produces excellent signal sensitivity. However, it is also known that the characteristics of mass produced vacuum tubes vary considerably from tube-to-tube so that a fixed biasing arrangement which works well with one tube may be completely unsatisfactory with another tube in the circuit. Consequently, a fixed biasing arrangement is incompatible with interchangeability of tubes.

Interchangeability is enhanced in circuitry which utilizes a large cathode resistor to make the tubes, in effect, "look alike." Thus, if a particular tube has a tendency to draw large currents, the bias across the cathode resistor will increase and this tendency will be compensated for. On the other hand, if a different tube tends to draw small currents, there is less bias developed across the cathode resistor. The overall effect is a normalization of the anode dissipation characteristics of the tubes and a reduction in the "spread" therebetween.

If a relatively large cathode resistor were used by itself, the degenerative effect of this resistor would result in a very low signal sensitivity. The signal sensitivity can be increased sufficiently by placing a large electrolytic bypass capacitor in parallel with the cathode resistor. The parallel combination of cathode resistor and bypass capacitor provides for a DC bias on the cathode and, at the same time, maintains the cathode at substantially AC ground potential so that the tube is kept within the desired range of anode dissipation without destroying the signal sensitivity. However, a large electrolytic capacitor is an expensive element, and it is, therefore, desirable to operate the output tube without resorting to the expedient of providing signal bypass for the cathode resistor.

Accordingly, the principal object of this invention is to provide an improved audio circuit in a television receiver.

A further object of this invention is to provide an economical audio circuit in a television receiver which maintains good signal sensitivity.

2

In accordance with a preferred embodiment of this invention, the audio output circuit is provided with regenerative feedback from the cathode of the output tube to the control grid thereof. This regenerative feedback increases the signal sensitivity of the output stage so that the need for an expensive bypass capacitor is eliminated. At the same time, the presence of the cathode resistor ensures that the circuit will maintain a large sample of tubes of similar type within their proper range of anode dissipation.

The circuit of this invention is especially well suited for use with an audio detector which employs a pentode vacuum tube such as, for example, a quadrature type detector. Thus, in further accordance with this invention, an alternating current connection is made between the cathode of the audio output tube and the screen grid of the vacuum tube in the audio detector. The audio signal on the cathode is thus amplified in the vacuum tube and coupled back into the control grid of the output tube. This results in the regenerative feedback which increases the signal sensitivity of the output stage. The alternating current connection may be, in accordance with the invention, a capacitor connected between the cathode of the output tube and the screen grid. This capacitor need not be an electrolytic capacitor so its presence does not add substantially to the overall cost of the circuit.

This invention thus provides a more economical audio circuit for a television receiver by providing regenerative feedback from the cathode to the control grid of the tube in the output stage to preserve the signal sensitivity of the output stage while retaining the tube interchangeability characteristics thereof.

Figure 2:
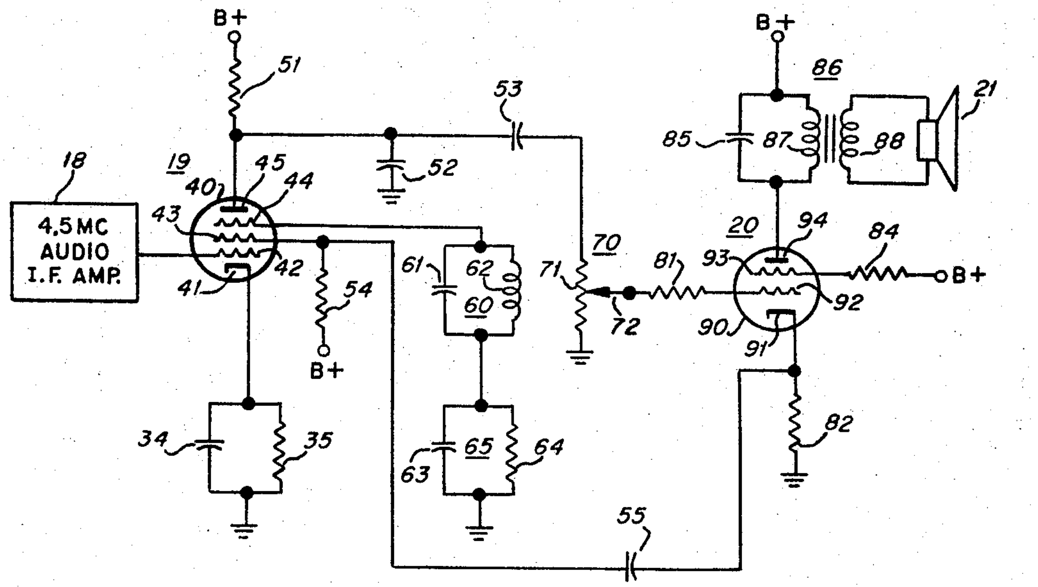

Other objects, features, and advantages of this invention, together with a complete understanding thereof, will be gained from a consideration of the following description in conjunction with the accompanying drawing in which FIG. 1 is a block diagram of a conventional television receiver and FIG. 2 is a schematic diagram of the portion of FIG. 1 in which this invention is embodied.

Referring to FIG. 1, an antenna 10 is coupled to block 11 which may contain a converter and an IF amplifier. This conventional circuitry functions to convert a received television signal to an IF signal and to amplify the IF signal. This amplified IF signal is coupled to a video detector 12 which develops a composite video signal containing video and audio information components and synchronizing signal components. The composite video signal is coupled to block 13 which may contain one or more stages of video amplification. At this point the various components of the composite video signal are separated. The video information component is coupled to the picture tube 16. Sync separator 14 separates out the synchronizing signal component, and the synchronizing signal is coupled to block 15 which may contain horizontal and vertical sweep circuits and a high voltage circuit for developing the large direct current potential required by the television picture tube. The audio information component is coupled to block 18 which may contain a 4.5 megacycle audio IF amplifier.

The amplified audio IF signal from block 18 is coupled to audio detector 19 which recovers the audio information. The audio signal is coupled to audio amplifier 20 which drives speaker 60 to reproduce the audio accompaniment of the video signal.

The above description has been necessarily brief because the functions of the elements within the blocks are well known in the art.

In FIG. 2, a schematic diagram of the circuitry in blocks 19 and 20 of FIG. 1 is shown. Audio IF amplifier 18 is coupled to the input of audio detector 19 which, as shown, is the quadrature vacuum tube type. Vacuum tube 40 includes a cathode 41, a control grid 42, a screen grid 43, a suppressor grid 44 and an anode 45. A load resistor 51 is connected between a source of B+ potential and anode 45. A capacitor 34 and a resistor 35 are connected in parallel between cathode 41 and a source of ground reference potential to provide DC bias for tube 40 without substantially degrading the signal sensitivity. Screen grid 43 is connected to a source of B+ potential through a resistor 54 and is AC coupled to cathode 91 of tube 90 through capacitor 55. The reason for this connection will be discussed later. A tuned circuit 60, comprising a capacitor 61 and an inductance 62 in parallel, is connected to suppressor grid 44. The other end of tuned circuit 60 is connected to a RC network 65 consisting of a resistor 64 and a capacitor 63 in parallel. The other end of network 65 is connected to a source of ground potential.

Anode 45 is coupled to ground potential through a capacitor 52 to provide signal bypassing and is AC coupled to a volume control circuit 70 through capacitor 53. Volume control circuit 70 consists of a resistance element 71 and a movable tap 41.

Audio amplifier 50 includes a vacuum tube 90 having a cathode 91, a control grid 92, a screen grid 93, and an anode 94. Movable tap 72 of volume control circuit 70 is connected to control grid 92 through resistor 81. An audio output transformer 86, including a primary winding 87 and a secondary winding 88, provides a load for audio amplifier 20. Primary winding 87 is connected between anode 94 and a source of B+ potential. A capacitor 85 is connected in parallel with primary winding 87 for the purpose of "rolling off" some of the high frequency signals and protecting transformer 86 in the event the circuit connected to secondary winding 88 is opened.

Secondary winding 88 of transformer 86 is connected to a speaker 21. Cathode 91 is connected to a source of ground potential through cathode resistor 82. Screen grid 93 is connected to a source of B+ potential through a resistor 84. As described above cathode 91 is AC coupled to screen grid 43.

It will be noted by those who are familiar with the television art that audio detector 19, as depicted, is a conventional locked oscillator, quadrature grid type of detector which is used extensively in the television field. Except for the AC feedback connection through capacitor 55 from cathode 91 to screen grid 42, audio detector 19 and audio amplifier 50 are of conventional design.

In television signals the separation between the video signal carrier and the audio signal carrier is 4.5 megacycles as prescribed by FCC regulation. The audio subcarrier is a frequency modulated wave wherein a 25 kilocycle deviation in frequency represents maximum modulation.

The output of audio IF amplifier 18 is a 4.5 megacycle beat signal which contains the FM audio information. The operation of audio detector 19 can be described briefly as follows. Tuned circuit 60 is excited into oscillation by so-called energy capture by suppressor grid 44 from the anode-cathode current in pentode tube 40. The interelectrode capacitance between suppressor grid 44 and control grid 42 completes a feedback loop which enables the oscillation in the circuit to be self-sustaining at 4.5 megacycles. The oscillation results in the application of an oscillating potential to suppressor grid 25, and this potential is in quadrature with the signal on control grid 42 when that signal is at its unmodulated frequency. As the signal on the control grid varies between 4.5 megacycles plus 25 kilocycles and 4.5 megacycles minus 25 kilocycles, the phase difference between the potentials on suppressor grid 44 and control grid 42 changes accordingly so that the flow of current to anode 45 is controlled. The anode current is proportional to the change in frequency of the input signal and, therefore, the incoming FM signal is detected. The audio signal which results is coupled through volume control circuit 70 to the input of audio amplifier 20.

With cathode resistor 82 being, as shown, unbypassed, the signal sensitivity of audio amplifier 20 would be prohibitively low if it were not for the feedback connection from cathode 91 to screen grid 43 through capacitor 55. The audio signal on cathode 91 is coupled to screen grid 43 and is amplified by tube 40 and coupled back to the control grid 92. This regenerative feedback loop increases the signal sensitivity of audio amplifier 20 so that an expensive bypass capacitor for cathode resistor 82 is not required. At the same time, sufficient cathode bias is developed to provide good interchangeability among tubes without placing stringent requirements on the acceptability limits thereof.

It is to be understood that the above description of a particular embodiment of this invention is for purposes of illustration only and that numerous modifications could be made by those skilled in the art without departing from the spirit and scope of this invention as claimed in the following claims.

The embodiments of the invention in which an exclusive property or priviledge is claimed are defined as follows:

1. In combination in a television receiver: a quadrature audio detector including a vacuum tube having a screen grid and an anode with an output circuit coupled thereto; an audio output tube including a control grid and a cathode; a cathode resistor connected between said cathode and said source of reference potnetial; means coupling said output circuit to said control grid; and means alternating current coupling said cathode to said screen grid, the signal on said cathode being amplified by said vacuum tube and coupled to said control grid to offset the degenerative effect of said cathode resistor, whereby the need for a cathode resistor signal bypass is obvitaed without substantially degrading the signal sensitivity and anode dissipation characteristics of said audio output tube.

2. In combination in a signal translation system; detecting means including a vacuum tube having a screen grid for developing a demodulated audio output signal from an input frequency modulated signal; an audio output tube including a control grid and a cathode; means coupling said audio output signal to said control grid; a cathode resistor connected between said cathode and a source of reference potential; and circuit means AC coupling said cathode to said screen grid; said circuit means providing positive signal feedback to said detecting means to offset the degenerative effects of said cathode resistor and eliminate the need for a cathode resistor bypass.

3. The combination as claimed in claim 2 wherein; said detecting means is of the quadrature type and said vacuum tube includes an anode with an output circuit coupled thereto; said means coupling said audio output sginal to said control grid includes a volume control circuit connected between said output circuit and said control grid; and said circuit means comprises a capacitor connected between said cathode and said screen grid whereby, the audio signal at said cathode is amplified by said vacuum tube and coupled to said control grid.

References Cited

UNITED STATES PATENTS 2,752,432 6/1956 Richter ............ 179—171

ROBERT L. GRIFFIN, *Primary Examiner.*

R. L. RICHARDSON, *Assistant Examiner.*

U.S. Cl. X.R.

329—120; 325—486; 330—93, 87